United States Patent

Hattori et al.

[11] 4,205,033
[45] May 27, 1980

[54] PROCESS FOR PRODUCING COMPACT SILICON NITRIDE CERAMICS

[75] Inventors: Yoshinori Hattori; Tamotu Miyachi, both of Nagoya, Japan

[73] Assignee: NGK Spark Plug Co., Ltd., Nagoya, Japan

[21] Appl. No.: 935,416

[22] Filed: Aug. 22, 1978

[30] Foreign Application Priority Data

Aug. 22, 1977 [JP] Japan .................................. 52-100314

[51] Int. Cl.² ............................................ C04B 35/58
[52] U.S. Cl. ..................................... 264/65; 106/63; 106/73.4; 106/73.5; 264/332
[58] Field of Search .................. 264/65, 332; 106/73.4, 106/73.5, 63

[56] References Cited

U.S. PATENT DOCUMENTS

| | | | |
|---|---|---|---|
| 3,969,125 | 7/1976 | Komeya et al. | 264/63 |
| 3,989,782 | 11/1976 | Lumby et al. | 264/332 |
| 4,127,416 | 11/1978 | Lumby et al. | 106/73.5 |

*Primary Examiner*—John A. Parrish
*Attorney, Agent, or Firm*—Sughrue, Rothwell, Mion, Zinn and Macpeak

[57] ABSTRACT

A process for producing a compact silicon nitride ceramic product which comprises molding a powder mixture of $Si_3N_4$, $Ta_2O_5$ and $Al_2O_3$ in proportions defined by the region A, B, C, D in the FIGURE within the ranges of 65.0 to 96.0% by volume $Si_3N_4$, 1.0 to 32.0% by volume $Ta_2O_5$ and 3.0 to 20.0% by volume $Al_2O_3$, and then firing the powder mixture in a non-oxidizing atmosphere containing a carbon compound; or hot-pressing the powder mixture; in a graphite mold.

7 Claims, 1 Drawing Figure

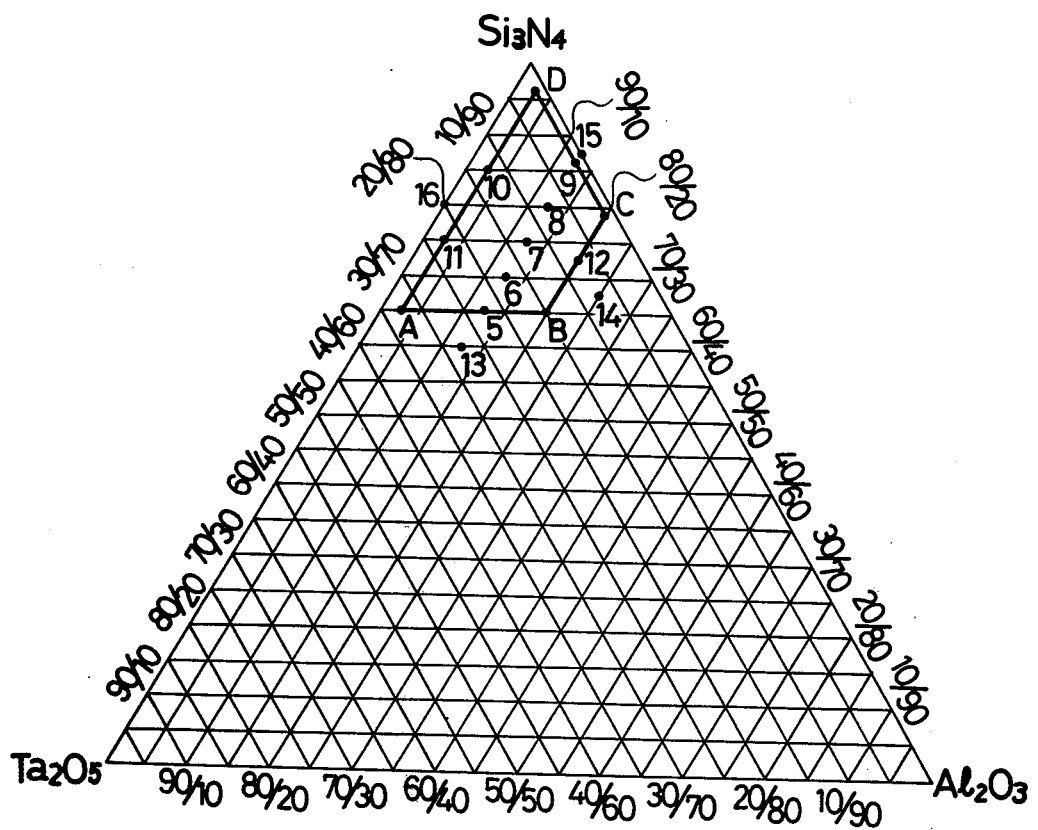

PROCESS FOR PRODUCING COMPACT SILICON NITRIDE CERAMICS

BACKGROUND OF THE INVENTION

1. Field of the Invention

This invention relates to a process for producing compact silicon nitride ceramics.

2. Description of the Prior Art

Silicon nitride ($Si_3N_4$) ceramics have a unique low degree of thermal expansion, high mechanical strength and superior thermal stability, and therefore, have attracted attention as various thermally stable materials of high strength. However, ceramic products thereof have unsatisfactory sinterability, and various efforts have been made to improve this property. Products which have emerged from these efforts are still unsatisfactory; particularly, bubbling occurs during manufacture at high temperature in air, which is an inherent defect of silicon nitride ceramics. Therefore, elimination of this defect has been strongly desired.

SUMMARY OF THE INVENTION

An object of this invention to provide a process for producing on a mass-production basis silicon nitride ceramics having superior properties hitherto not attainable, which are free from the defects of the prior art.

Accordingly, this invention provides a process for producing a compact silicon nitride ceramic product which comprises molding a powder mixture of $Si_3N_4$, $Ta_2O_5$ and $Al_2O_3$ in proportions defined by the region A, B, C and D in the attached Figure, the points A, B, C and D, respectively representing the compositions set forth below in volume %:

|   | $Si_3N_4$ | $Ta_2O_5$ | $Al_2O_3$ |
|---|---|---|---|
| A | 65.0% | 32.0% | 3.0% |
| B | 65.0% | 15.0% | 20.0% |
| C | 79.0% | 1.0% | 20.0% |
| D | 96.0% | 1.0% | 3.0% | and then firing the powder mixture in a non-oxidizing atmosphere containing a carbon compound; or hot-pressing the powder mixture; in a graphite mold.

BRIEF DESCRIPTION OF THE DRAWING

The attached FIGURE is a triangular diagram of the basic components of a powder mixture from which compact silicon nitride ceramics are produced in accordance with this invention.

DETAILED DESCRIPTION OF THE INVENTION

The $Si_3N_4$, the $Ta_2O_5$ and the $Al_2O_3$ powders used as starting materials are all commercially available materials. A suitable particle size for these powders is an average particle size of about $3\mu$ or less, preferably $1\mu$ or less, for the $Si_3N_4$, about $2\mu$ or less, preferably $1\mu$ or less, for the $Ta_2O_5$ and about $2\mu$ or less, preferably $1\mu$ or less, for the $Al_2O_3$.

In preparation of the compact silicon nitride ceramic product of this invention, a powder mixture of $Si_3N_4$, $Ta_2O_5$ and $Al_2O_3$ within the proportions defined by the region A, B, C and D in the attached FIGURE is prepared and then the molded powder mixture is fired in a non-oxidizing atmosphere containing a carbon compound. A suitable firing temperature for the powder mixture is in the range of about 1600° C. to about 1850° C., preferably 1650° C. to 1800° C. If the temperature is less than about 1600° C., sinterability is degraded, and if the temperature is above about 850° C., silicon nitride is decomposed to an excessive extent. Suitable non-oxidizing atmospheres which can be used include those atmospheres where oxygen is present in an amount of about 5 volume percent or less, preferably 2 volume percent or less. The carbon compound present generally is carbon monoxide contained in the graphite mold, or carbon monoxide generated and obtained by reaction with oxygen. A suitable amount of the carbon compound is less than about 30% by volume (with at least some carbon compound being present) using hot-pressing or normal pressure sintering.

Alternatively, the molded powder mixture can be hot-pressed in a graphite mold. A suitable hot-pressing temperature is in the range of about 1550° C. to about 1850° C. preferably 1600° C. to 1800° C. A suitable pressure in the hot-pressing is a pressure of more than about 100 kg/cm² (with higher, pressures being preferred). In general, a suitable pressure in operation is preferably 200 to 400 kg/cm². Where the hot pressing temperature is low, the hot pressing period preferably is increased and a higher pressure preferably is used. In general, a hot pressing period of about 30 to 60 minutes is suitable. In hot pressing, since a graphite mold is used, oxygen in the interior of the mold reacts with carbon to produce carbon monoxide, even if hot pressing is conducted in the air. Thus, a non-oxidizing atmosphere is obtained in the mold, and therefore, it is not necessary to provide a non-oxidizing atmosphere around the graphite mold where hot-pressing is employed.

The following Examples are given to illustrate the present invention more specifically. Unless otherwise indicated, all parts percents, ratios and the like are by weight.

EXAMPLE 1

$Si_3N_4$ powder (a product of Advanced Material Engineering; purity: 98 weight %; containing more than 80 weight % α-type silicon nitride) having an average particle diameter of 1 micron, $Ta_2O_5$ powder (a product of Helman Schtalk; purity: 99.5 weight %) having an average particle diameter of 1.5 microns, and $Al_2O_3$ powder (A-16; a product of Alcoa) having an average particle diameter of 1 micron, all commercially available materials, were mixed in the various proportions shown in Table 1 below, and an organic binder (parafin) was added thereto. The starting powder was press-formed under a pressure of 2,000 kg/cm² into a size of 5×10×30 mm, first heated to 500° C. in a nitrogen atmosphere to decompose and remove the organic binder, and then placed in a graphite muffle furnace and fired. Thus, Sample Nos. 1 to 16 were produced. Furthermore, each of the starting powder mixtures having the compositions corresponding to Samples Nos. 6 to 8 was charged into a graphite mold, and hot-pressed at 1750° C. at 200 kg/cm² for 20 minutes to produce Sample Nos. 6' to 8'.

The various properties shown in Table 1 below of these samples were measured, and the results obtained are shown in Table 1.

Table 1

| Sample No. | Composition (vol. %) | | | Firing Temperature (°C.) | Properties | | | | Remarks |
|---|---|---|---|---|---|---|---|---|---|
| | Main Component $Si_3N_4$ | Subsidiary Components | | | Density (T.D. ratio, %) | Modulus of Rupture Strength* ($kg/mm^2$) | Coefficient of Thermal Expansion** (R.T.-1200° C. 1° C.) | Thermal Stability (°C.) | |
| | | $Ta_2O_5$ | $Al_2O_3$ | | | | | | |
| 1 | 65.0 | 32.0 | 3.0 | 1700 | 94.0 | 44 | $3.1 \times 10^{-6}$ | 1250 | Point A in the FIG. |
| 2 | 65.0 | 15.0 | 20.0 | 1650 | 94.1 | 49 | 3.3 | 1250 | Point B in the FIG. |
| 3 | 79.0 | 1.0 | 20.0 | 1650 | 94.3 | 48 | 3.4 | >1300 | Point C in the FIG. |
| 4 | 96.0 | 1.0 | 3.0 | 1750 | 94.8 | 47 | 3.2 | >1300 | Point D in the FIG. |
| 5 | 65.0 | 22.5 | 12.5 | 1700 | 95.6 | 48 | 3.0 | 1250 | |
| 6 | 70.0 | 17.5 | 12.5 | 1700 | 96.8 | 54 | 3.1 | >1300 | |
| 7 | 75.0 | 12.5 | 12.5 | 1700 | 96.9 | 56 | 3.1 | >1300 | |
| 8 | 80.0 | 7.5 | 12.5 | 1650 | 96.2 | 58 | 3.2 | >1300 | |
| 9 | 86.5 | 1.0 | 12.5 | 1650 | 96.0 | 49 | 3.2 | >1300 | |
| 10 | 85.0 | 12.0 | 3.0 | 1700 | 95.5 | 47 | 3.2 | 1250 | |
| 11 | 75.0 | 22.0 | 3.0 | 1700 | 95.2 | 46 | 3.2 | 1250 | |
| 12 | 72.5 | 7.5 | 20.0 | 1650 | 96.4 | 45 | 3.4 | >1300 | |
| 6' | 70.0 | 17.5 | 12.5 | 1750 | 99.4 | 85 | 3.1 | >1300 | Hot-pressed (1750° C.; 200 $kg/cm^2$) |
| 7' | 75.0 | 12.5 | 12.5 | 1750 | 99.6 | 83 | 3.1 | >1300 | Hot-pressed (1750° C.; 200 $kg/cm^2$) |
| 8' | 80.0 | 7.5 | 12.5 | 1750 | 99.5 | 80 | 3.2 | >1300 | Hot-pressed (1750° C.; 200 $kg/cm^2$) |
| 13 | 60.0 | 27.5 | 12.5 | 1700 | 94.2 | 37 | 3.2 | 1200 | Outside the present invention |
| 14 | 68.0 | 7.0 | 25.0 | 1700 | 93.3 | 30 | 4.5 | 1250 | Outside the present invention |
| 15 | 87.0 | — | 12.5 | 1800 | 90.1 | 28 | 3.5 | 1250 | Outside the present invention |
| 16 | 80.0 | 20.0 | — | 1800 | 87.7 | 25 | 3.2 | 1200 | Outside the present invention |

*JIS B-4104
**JIS C-2141
Note
The TD ratio, % was calculated using the following relationship:

TD ratio (%) = $\frac{\text{Density of Sintered Body}}{\text{Theoretical Density}}$ (100)

The coefficient of thermal expansion is that from room temperature (R.T.) to 1200° C. per °C.

The thermal stability was measured as follows: The surface of a sample was rapidly heated with a burner, and the temperature at which bubbling occurred at the surface due to the vitrification of silicon nitride was measured using a photo high-temperature meter. Thus, the silicon nitride ceramic bodies are stable up to the temperatures listed in Table 1 above.

It can be clearly seen from the results in Table 1 above that Sample Nos. 1 to 12 including Sample Nos. 6' to 8' produced by hot-pressing had increased thermal stability and modulus of rupture strength and a reduced coefficient of thermal expansion despite the fact that the firing temperatures for these samples were considerably lower than the firing temperatures used for producing Sample Nos. 13 to 16 which were outside the scope of the present invention.

The high thermal stability and other superior properties were obtained in this Example by the addition of specific proportions of $Ta_2O_5$ and $Al_2O_3$ as subsidiary components to $Si_3N_4$ as a main component. This is believed to be due to the fact that the $Ta_2O_5$ and $Al_2O_3$ in the composition first form a solid solution which then reacts with the $Si_3N_4$ to form a compact sintered body; thereafter, the $Ta_2O_5$ is reduced by carbon in the atmosphere to form TaC; the thermal stability of the sintered body is increased, and bubbling of the sintered body is inhibited, by the high melting point and the high thermal conductivity of TaC; and the high mechanical strength of the TaC associated with the high mechanical strength of the $Al_2O_3$ contributes to the increase of the modulus of rupture strength of the final ceramic product.

In the starting material used in this invention, the proportions of $Si_3N_4$ as a main component and of $Ta_2O_5$ and $Al_2O_3$ as subsidiary components are limited to the region connecting points A, B, D and D in the attached FIGURE within the range of 65.0 to 96.0% by volume $Si_3N_4$, 1.0 to 32.0% by volume $Ta_2O_5$ and 3.0 to 20.0% by volume $Al_2O_3$. This is because as shown by Sample Nos. 1 to 12 and 6' to 8' in Table 1, compositions having proportions within the above-specified range can be formed into products having superior properties including high thermal stability despite the fact that sintering occurs at a temperature of 1700° C. or less, whereas Sample Nos. 13, 14, 15 and 16 obtained from materials having proportions outside the above-specified range have a markedly low modulus of rupture strength, and are not useful in practical application.

Addition of a small amount of an alkaline earth metal oxide such as MgO, CaO and BaO or a compound convertible to an alkaline earth metal oxide to the composition defined by the region A, B, C, D described above reduces the viscosity of a molten liquid of $Ta_2O_5$ and $Al_2O_3$ as subsidiary components and free $SiO_2$ present in $Si_3N_4$ as a main component, decreases the sintering temperature, and promotes compaction. Suitable compounds convertible to alkaline earth metal oxides during firing which can be used include for example, carbonates, sulfates, chlorides, nitrates, fluorides, and hydroxides of alkaline earth metals. A suitable average particle size of less than about 2μ; preferably less than 1μ, can be used for a powder mixture containing $Si_3N_4$, $Ta_2O_5$ and $Al_2O_3$ plus the above described alkaline earth metal oxide. Excessive amounts of such an alkaline earth metal oxide cause a reduction in the modulus of rupture strength and thermal stability, and an increase in the coefficient of thermal expansion. Considering all factors, a suitable amount of the alkaline earth metal oxide that can be added for practical purposes is up to about 5 parts by weight per 100 parts by weight of the starting powder of $Si_3N_4$ as a main component and $Ta_2O_5$ and $Al_2O_3$ as secondary components. This is demonstrated by the results obtained in Example 2 below.

EXAMPLE 2

The procedures of Example 1 were repeated except that each of the alkaline earth metal oxides shown in Table 2 below was added in the amounts indicated to 100 parts by weight of a powder mixture of the composition used for Sample No. 7 (this composition being centrally positioned in the region A, B, C, D in the attached FIGURE) comprising $Si_3N_4$ as a main component and $Ta_2O_5$ and $Al_2O_3$ as secondary components. The properties of the resulting samples were measured, and the results obtained are shown in Table 2 below.

|   | $Si_3N_4$ | $Ta_2O_5$ | $Al_2O_3$ |
|---|---|---|---|
| A | 65.0% | 32.0% | 3.0% |
| B | 65.0% | 15.0% | 20.0% |
| C | 79.0% | 1.0% | 20.0% |
| D | 96.0% | 1.0% | 3.0% |

Table 2

| Sample No. | Basic Components* Main Component $Si_3N_4$ | Subsidiary Components $Ta_2O_5$ | $Al_2O_3$ | Total | Additive** MgO | CaO | BaO | SrO | Total | Firing Temperature (°C.) | Density (T.D. ratio, %) | Modulus of Rupture Strength (kg/mm²) | Coefficient of Thermal Expansion (RT-1200° C. 1° C.) | Thermal Stability (°C.) | Remarks |
|---|---|---|---|---|---|---|---|---|---|---|---|---|---|---|---|
| 7 | 75.0 | 12.5 | 12.5 | 100 | — | — | — | — | — | 1700 | 96.9 | 56 | 3.1 | >1300 | Reproduced from Table 1 |
| 7a | " | " | " | " | 0.5 | — | — | — | 0.5 | 1700 | 97.0 | 56 | 3.1 | >1300 | |
| 7b | " | " | " | " | 2.0 | — | — | — | 2.0 | 1670 | 97.2 | 57 | 3.2 | 1300 | |
| 7c | " | " | " | " | 3.0 | — | — | — | 3.0 | 1650 | 97.3 | 56 | 3.4 | 1250 | |
| 7d | " | " | " | " | 3.5 | — | — | — | 3.5 | 1630 | 97.1 | 53 | 3.6 | 1150 | |
| 7j | " | " | " | " | 5.0 | — | — | — | 5.0 | 1630 | 97.0 | 53 | 3.6 | 1150 | |
| 7k | " | " | " | " | 6.0 | — | — | — | 6.0 | 1600 | 97.1 | 50 | 3.9 | 1000 | Amount of additive outside specified range |
| 7e | " | " | " | " | — | 2.0 | — | — | 2.0 | 1650 | 97.2 | 55 | 3.3 | 1250 | |
| 7f | " | " | " | " | — | — | 2.0 | — | 2.0 | 1650 | 96.5 | 54 | 3.5 | 1250 | |
| 7g | " | " | " | " | — | — | — | 2.0 | 2.0 | 1670 | 97.2 | 55 | 3.4 | 1300 | |
| 7h | " | " | " | " | 1.0 | — | 1.0 | — | 2.0 | 1670 | 97.0 | 56 | 3.3 | 1250 | |
| 7i | " | " | " | " | — | 1.0 | — | 1.0 | 2.0 | 1670 | 97.1 | 54 | 3.4 | 1250 | |

*Parts by volume
**Parts by weight per 100 parts by weight of the basic components In Examples 1 and 2, oxides are directly used as starting subsidiary components and additive components. Other compounds convertible to oxides by heating in a customary manner, such as salts, can also be used in the invention.

While the invention has been described in detail and with reference to specific embodiments thereof, it will be apparent to one skilled in the art that various changes and modifications can be made therein without departing from the spirit and scope thereof.

What is claimed is:

1. A process for producing a compact silicon nitride ceramic product which comprises molding a powder mixture of $Si_3N_4$, $Ta_2O_5$ and $Al_2O_3$ in the volume proportions defined by the region A, B, C and D in the FIGURE, the points A, B, C and D representing powder mixtures of the compositions, in volume percent, indicated below:

and then firing the powder mixture in a non-oxidizing atmosphere containing a carbon compound; or hot-pressing the powder mixture; in a graphite mold.

2. The process of claim 1, wherein at least one alkaline earth metal oxide or an alkaline earth metal compound convertible to said oxide in an amount of 5 parts by weight or less as the alkaline earth metal oxide, per 100 parts by weight of the powder mixture is further added to the powder mixture prior to molding.

3. The process of claim 1, wherein said $Si_3N_4$ has an average particle size of about $3\mu$ or less, said $Ta_2O_5$ has an average particle size of about $2\mu$ or less and said $Al_2O_3$ has an average particle size of about $2\mu$ or less.

4. The process of claim 1, wherein said firing temperature is in the range of about 1600° C. to about 1850° C.

5. The process of claim 1, wherein said non-oxidizing atmosphere has oxygen present in an amount of about 5 volume percent or less.

6. The process of claim 1, wherein said hot-pressing is at a temperature in the range of about 1550° C. to about 1850° C. and is at a pressure of more than about 100 kg/cm².

7. The process of claim 1, wherein said compact silicon nitride ceramic product has increased thermal stability and modulus of rupture strength in combination with a reduced coefficient of thermal expansion.

* * * * *